United States Patent [19]

Schotter

[11] Patent Number: 5,205,510

[45] Date of Patent: Apr. 27, 1993

[54] OPTICAL FIBER BOBBIN WITH STRESS-REDUCING SLEEVE

[75] Inventor: Daniel K. Schotter, Tucson, Ariz.

[73] Assignee: Hughes Aircraft Company, Los Angeles, Calif.

[21] Appl. No.: 562,190

[22] Filed: Aug. 3, 1990

[51] Int. Cl.[5] .................. B65H 55/00; B65H 75/02
[52] U.S. Cl. .................. 242/159; 242/118.4; 242/118.7
[58] Field of Search .............. 242/159, 172, 173, 176, 242/177, 178, 117, 118.3, 118.32, 118.4, 118.7, 118.2

[56] References Cited

U.S. PATENT DOCUMENTS

| | | | |
|---|---|---|---|
| 2,554,537 | 5/1951 | Moss | 242/118.2 |
| 2,982,493 | 5/1961 | Sibille | 242/118.2 |
| 3,297,155 | 1/1967 | Gattenby, Jr. et al. | 242/159 X |
| 3,522,700 | 8/1970 | Fisher, Jr. | 242/118.2 X |
| 3,554,461 | 1/1971 | Boutonnet | 242/159 X |
| 3,672,598 | 6/1972 | Saveth | 242/118.2 |
| 4,763,785 | 8/1988 | Bradley et al. | 242/159 X |
| 4,903,607 | 2/1990 | Clark | 242/159 X |
| 4,957,344 | 9/1990 | Chesler et al. | 242/118.2 X |
| 4,961,545 | 10/1990 | LeCompte | 242/159 X |

Primary Examiner—Stanley N. Gilreath
Attorney, Agent, or Firm—R. M. Heald; C. D. Brown; W. K. Denson-Low

[57] ABSTRACT

A bobbin (50) includes a substantially cylindrical bobbin support (52), formed of a structural material such as aluminum or graphite-epoxy composite material, and an overlying sleeve (58) that slides on the bobbin support (52), formed of a material having a longitudinal coefficient of thermal expansion matched to that of the longitudinal coefficient of thermal expansion of an optical fiber pack (66) wound upon the sleeve (58). One end of the sleeve (58) is fixed to the corresponding end of the bobbin support (52). The expansion coefficient of the sleeve material is preferably at least about $50 \times 10^{-6}$ per degree F., to more closely match that of the fiber pack in the direction perpendicular to the fibers.

16 Claims, 1 Drawing Sheet

OPTICAL FIBER BOBBIN WITH STRESS-REDUCING SLEEVE

BACKGROUND OF THE INVENTION

This invention relates to optical fibers and cables, and, more particularly, to the bobbins upon which such fibers and cables are wound.

Optical fibers are strands of glass fiber processed so that light beams transmitted therethrough are subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a plentiful substance, silicon dioxide.

Glass optical fibers are typically fabricated by preparing a preform of glasses of two different optical indices of refraction, one inside the other, and processing the preform to a fiber. The optical fiber is coated with a polymer layer termed a buffer to protect the glass from scratching or other damage, the resulting combination of an optical fiber within a buffer layer being termed an "optical cable". As an example of the dimensions, in a typical configuration the diameter of the glass optical fiber is about 125 micrometers, and the diameter of the fiber plus the polymer buffer (optical cable diameter) is about 250 micrometers (approximately 0.010 inches).

For such very fine fibers, the handling of the optical fiber and optical cable to avoid damage that might reduce its light transmission properties becomes an important consideration. The optical cable is typically wound onto a cylindrical or tapered bobbin made of aluminum or a composite material, with many turns adjacent to each other in a side-by-side fashion, and succeeding layers one on top of the other. The final assembly of the bobbin and the wound layers of optical cable is termed a canister, and the mass of wound optical cable is termed the fiber pack. When the optical cable is later to be used, the optical cable is paid out from the canister in a direction parallel to the axis of the bobbin and the canister, termed the payout axis.

It has been found by experience that, where the optical cable is to be paid out from the canister in a rapid fashion, as for example over a hundred meters per second, the turns of optical cable must be held in place on the canister with an adhesive. The adhesive holds each turn of optical cable in place as adjacent turns and layers are initially wound onto the canister, and also as adjacent turns and layers are paid out. Without the use of an adhesive, payout of the optical cable may not be uniform and regular, leading to snarls or snags of the cable that damage it or cause it to break as it is paid out.

Although the optical cable may be wound onto the bobbin smoothly to form a uniform fiber pack, during prolonged storage and temperature changes the adhesively bound fiber pack can shift due to the difference in thermal expansion between the bobbin and the fiber pack, and particularly the buffer layer of the optical cable. Instability can also result due to other factors including the longitudinal forces resulting from the winding tension and the bobbin taper. The resulting shifting of the fiber pack causes separations or slumps in the fiber pack, and the optical cable may not later pay out uniformly.

There therefore exists a need for a bobbin and fiber pack assembly that is resistant to separation and other failures during storage and thermal cycling, which in turn can lead to an inability to achieve proper payout during use. The present invention fulfills this need, and further provides related advantages.

SUMMARY OF THE INVENTION

The present invention provides an improved bobbin design that reduces the incidence of fiber pack failures resulting from thermal expansion mismatches. The bobbin is more complex than conventional bobbins, but is still readily fabricated and used on a commercial scale.

In accordance with the invention, a bobbin that supports an optical fiber pack comprises a bobbin support having a substantially cylindrical bobbin shell; and a sleeve that slidably fits over the bobbin shell and is fastened thereto at one end thereof, the sleeve being disposed such that a substantially cylindrical optical fiber pack can be wound upon the sleeve, the sleeve having a longitudinal coefficient of thermal expansion selected to match that of the fiber pack in the longitudinal direction.

More generally, a bobbin that supports an optical fiber pack comprises sleeve means for supporting a fiber pack wound thereupon, the sleeve means having a longitudinal axis; and support means within the sleeve means for supporting the sleeve means while permitting relative sliding movement of the sleeve means and the support means parallel to the longitudinal axis over at least a portion of the length of the sleeve means, the support means having a coefficient of thermal expansion parallel to the longitudinal axis of less than that of the sleeve means.

A key to the present invention is the recognition that separation, pop up, and surface cracking failures are caused primarily by a longitudinal mismatch in the thermal expansions of the bobbin and the fiber pack. The coefficient of thermal expansion of an aluminum bobbin is isotropic and about $13 \times 10^{-6}$ per degree F (Fahrenheit). The coefficient of thermal expansion of composite material bobbins is anisotropic and varies with the layup or winding sequence of the bobbin, but is generally much lower than that of aluminum in the circumferential direction and on the same order as that of aluminum in the longitudinal direction.

The coefficient of thermal expansion of the fiber pack in the longitudinal direction parallel to the bobbin's cylindrical or conical axis is much greater than that of either aluminum or the composite materials, and is generally on the order of $50$–$100 \times 10^{-6}$ per degree F. If there is no internal stress in the fiber pack when the bobbin is wound at ambient temperature, upon heating the free longitudinal expansion of the fiber pack is constrained along the surface of the bobbin by the smaller expansion of the bobbin. The fiber pack is thereby placed into internal longitudinal compression and outward bending during heating. If the stress and bending are sufficiently great, surface cracking between the turns of the fiber pack can occur. When the canister is later cooled, the fiber pack is placed into longitudinal tension and may fail by inter-turn separation if the stress reaches too high a level.

In the prior conventional canister, the fiber pack adheres tightly to the bobbin due to expansion effects and the adhesive, and cannot slip on the surface of the bobbin. The stresses arising between the bobbin and the fiber pack cannot therefore be reduced by such a slippage mechanism. In the present design, to the contrary, the bobbin support is provided with a sleeve upon which the fiber pack is wound. The sleeve is selected to have a thermal expansion coefficient greater than that of the bobbin support, and thence closer to the longitudinal coefficient of expansion of the fiber pack. Moreover, the sleeve is free to slide on the bobbin support, except at one end, so that the longitudinal thermal stresses can be relieved by the slippage of the sleeve over the bobbin support.

The present invention thus provides a more effective bobbin that is less prone to temperature induced movement within the fiber pack, and to expansion and contraction induced failures of the fiber pack. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
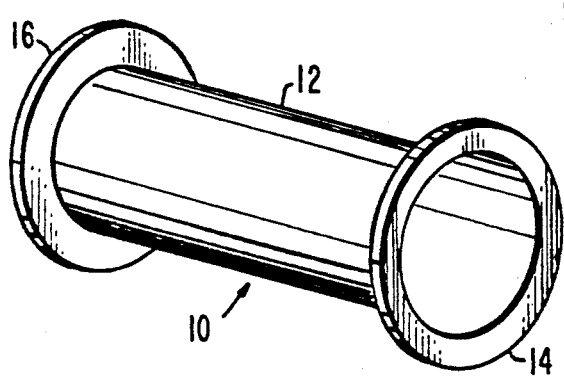
FIG. 1 is a perspective view of a bobbin upon which an optical cable is to be wound.

A bobbin 10 upon which an optical cable is wound is illustrated in FIG. 1. The bobbin 10 is generally substantially cylindrical, in the form of a hollow cylinder or a slightly tapered conical shell, with a conical angle of less than about 5 degrees. (As used herein, the term "substantially cylindrical" is defined to include both a hollow cylinder or a slightly tapered hollow cone, with a conical angle of less than about 5 degrees.) The bobbin has a radially recessed central portion 12, with a radially enlarged end 14. At the other end the bobbin 10 terminates in a flange 16 that permits it to be attached to other structure for support. The bobbin 10 is preferably formed of aluminum alloy or a nonmetallic composite material such as graphite-epoxy composite material. Other similar materials of construction and fabrication techniques can also be used.

Figure 2:
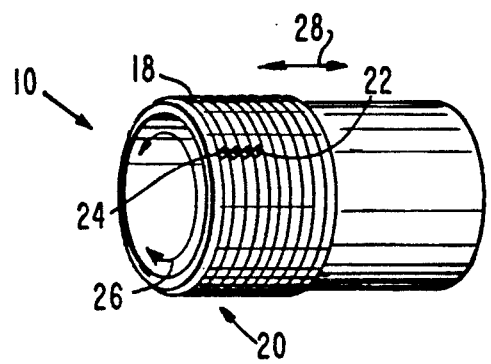
FIG. 2 is a perspective view of a fiber pack with a portion of the fiber pack shown in section.

FIG. 2 depicts a bobbin 10 with an optical cable 18 wound thereupon to form a fiber pack 20. The optical cable 18 has a central optical fiber 22 with a coating of an ultraviolet curing polymer that forms a buffer layer 24. It is wound onto a precision non-fiber baselayer on the bobbin 10, which provides the proper spacing and stability for the wound fiber, to form a first layer, then a second layer, and so on. During winding, a small amount of an adhesive is applied directly to the external surface of the optical cable 18 or to each successive layer as it is completed. The adhesive is important in controlling payout characteristics of the optical cable. Additionally, the adhesive gives the fiber pack 20 some physical strength so that it becomes a self supporting body.

When two bodies having different coefficients of thermal expansion, here the bobbin 10 and the fiber pack 20, are placed into contact and the temperature changed, thermal stresses are created. Under some circumstances, the two bodies can deform to counteract the thermal stresses with a responsive thermal strain. However, if the bodies are otherwise constrained, the thermal stresses build up until, if the thermal stresses become high enough, one or the other of the bodies experiences some type of failure.

In the case of a fiber pack wound upon a bobbin, the likelihood of a failure depends upon the direction under consideration. Referring to FIG. 2, in a circumferential direction 26 the coefficient of thermal expansion of the optical cable 18 is dominated by the optical fiber 22, which has a low coefficient of thermal expansion. The buffer layer 24 has a much higher coefficient of thermal expansion, but its tendency to expand is checked by the presence of the optical fiber 22. Moreover, thermal stresses such as may be present are borne by the optical fiber 22 portion of the optical cable 18. The optical fiber 22 is quite strong, and not likely to fail under the thermal stresses normally experienced with optical fiber canisters.

The thermal expansion situation in a longitudinal direction 28 is quite different. (The term "longitudinal" is selected in reference to its coincidence with the longitudinal axis of the bobbin. Here, the longitudinal coefficient of thermal expansion of the optical cable is that measured transverse to the optical fiber, not parallel to the optical fiber.) In the longitudinal direction 28, there is no continuous fiber to constrain the expansion of the fiber pack, and the thermal expansion of the optical fiber pack 22 in the longitudinal direction is large.

The longitudinal coefficient of thermal expansion of the optical fiber pack is about $50$–$100 \times 10^{-6}$ per degree F., due to the large coefficient of thermal expansion of the buffer layer material. (By contrast, the coefficient of thermal expansion of the optical fiber pack in the circumferential direction 26 is only about $1 \times 10^{-6}$ per degree F.) The longitudinal coefficient of thermal expansion of the bobbin depends upon the material of construction. For an aluminum bobbin, the longitudinal coefficient of thermal expansion is about $13 \times 10^{-6}$ per degree F. For a graphite-epoxy bobbin, the longitudinal coefficient of thermal expansion can be controlled to some extent by the fabrication procedure, but is typically on the order of less than $25 \times 10^{-6}$ per degree F.

Figure 3:
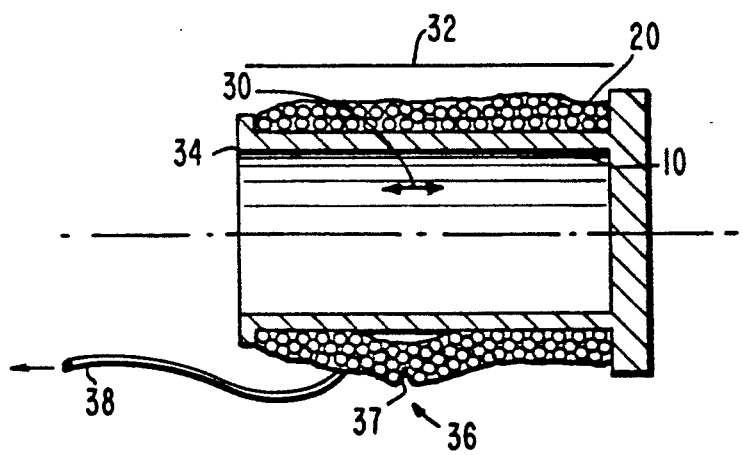
FIG. 3 is a side sectional view of a detail of a conventional cylindrical bobbin, illustrating the origin of thermal expansion-induced separation failures.

FIG. 3 is a side sectional view of a conventional bobbin 10 with a fiber pack 20 wound thereupon. The relative longitudinal coefficient of thermal expansion of an aluminum bobbin 10 is indicated by a scaled line 30, while the relative longitudinal coefficient of thermal expansion of the fiber pack is indicated by a scaled line 32. The length of the line 32 is made to be 5–6 times as long as the length of the line 30, indicating that for each degree rise in temperature, the increase in length of the fiber pack 20 is roughly 5–6 times the increase in length of the bobbin 10. For a composite bobbin, the disparity is usually less, but still not sufficiently small to prevent stability problems.

The expansion of the fiber pack 20 is constrained by its contact with the surface of the bobbin 10 and an end 34 of the bobbin 10 which may be present to facilitate winding of the fiber pack. The constraint to free expansion creates a compressive stress in the fiber pack. If the temperature is raised sufficiently high, the compressive stress may become so great that some of the windings of the optical cable may "pop up" to relieve the stress, as illustrated at numeral 36 of FIG. 3. Normally, the pop up 36 is of a few turns, but has been illustrated here in an extreme case for clarity. When the optical cable is paid out during use, as indicated by a cable length 38, the pop up 36 can interfere with the smooth unwinding of the optical cable 18, 38 from the bobbin 10. The outward bending stresses created by the compression can also cause fissures between the turns of the optical cable, as indicated at numeral 37.

Another type of failure of the fiber pack that can occur due to thermal expansion mismatch is a separation or slump, not illustrated in the drawings. When the bobbin and fiber pack are cooled from high temperature, the thermal expansion differences work in the reverse sense so that the fiber pack shrinks more rapidly than does the bobbin in the longitudinal direction. The fiber pack is placed into tension and may experience inter-turn fissures if the longitudinal tensile stresses within the fiber pack become sufficiently large to overcome the adhesive.

The present invention provides a modified bobbin that reduces the incidence of fiber pack failures due to thermal expansion mismatch. In accordance with this aspect of the invention, a bobbin comprises a substantially cylindrical bobbin support having a bobbin support flange at one end and having a longitudinal axis; a sleeve that slides over the bobbin support, the sleeve being made of a material that has a coefficient of thermal expansion parallel to the longitudinal axis that is greater than that of the bobbin support parallel to the longitudinal axis, the sleeve having a sleeve flange at one end thereof that is fastened to the bobbin support flange, whereby the sleeve is free to expand longitudinally by a different amount than does the bobbin support, except at the end where the flanges are fastened together; and an optical fiber pack wound upon the sleeve.

Figure 4:
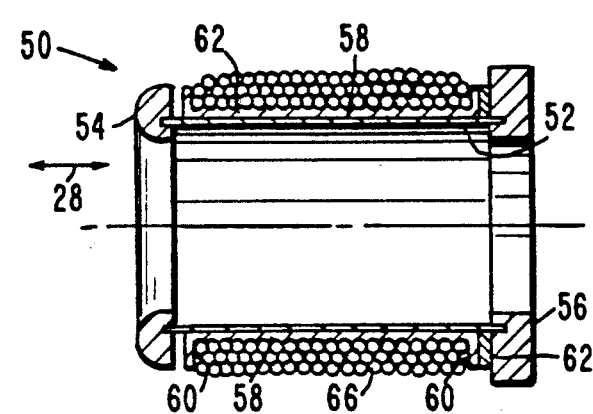
FIG. 4 is a side sectional view of a detail of a bobbin in accordance with the present invention.

A bobbin 50 in accordance with the invention is illustrated in FIG. 4. The bobbin 50 includes a substantially cylindrical bobbin support 52, in the form of a thin-walled hollow cylinder or a thin-walled hollow cone having a conical taper angle of less than about 5 degrees. The bobbin support 52 is made of a conventional bobbin material such as aluminum alloy or graphite-epoxy composite material. The bobbin support 52 provides the structural support for the system, and is therefore made strong. In a typical case, the bobbin support is made of the aluminum alloy 6061-T6 or graphite epoxy composite material, with a length of 5.9 inches, a diameter of 4.08 inches, and a wall thickness of 0.53 inches. The bobbin support 52 has an upstanding end piece 54 at one end to aid in cable pack winding, and a flange 56 at the other end to permit attachment of the bobbin 50 to another structure.

Overlying the bobbin support 52 is a sleeve 58 made of a material that has a coefficient of thermal expansion in the longitudinal direction matched to that of the longitudinal coefficient of thermal expansion of the fiber pack that is subsequently wound upon the sleeve 58. The longitudinal coefficient of thermal expansion of the sleeve is greater than that of the bobbin support, and is preferably in the range of about $50-100 \times 10^{-6}$ per degree F., about the same as that of the fiber pack in the longitudinal direction. The sleeve 58 has an upstanding end piece 60 at each end, one of those end pieces being a flange 62 that fastens to the flange 56 of the bobbin support 52 at the other end. The sleeve 58 preferably has a helical groove 62 extending along the length thereof. The groove 62 is preferably of about the same width as the diameter of the optical cable, to serve as a base layer for the first layer of the optical cable.

A fiber pack 66 is wound upon the sleeve 58 in the same manner that a fiber pack is wound upon a conventional bobbin.

Because the coefficient of thermal expansion of the sleeve 58 along the longitudinal direction 28 is more closely matched to that of the fiber pack 66, there is much less tendency for the fiber pack to experience pop up or separation failures because of thermal expansion mismatch is the longitudinal direction, by comparison with the prior approach wherein the fiber pack was wound directly upon a bobbin having a much lower coefficient of thermal expansion.

The material of construction of the sleeve 58 is selected so that its longitudinal coefficient of thermal expansion is matched as closely as possible to the longitudinal coefficient of thermal expansion of the fiber pack. At the present time, the preferred material of construction of the sleeve 58 is acrylonitrile butadiene styrene, a commercially available plastic sometimes sold as ABS plastic, which has a coefficient of thermal expansion of about $50-60 \times 10^{-6}$ per degree F., which is within the range, at the low end, of the expected longitudinal coefficient of thermal expansion of the fiber pack. A material at the low end of the range is preferred, so as not to have any greater disparity than necessary with the circumferential coefficient of thermal expansion of the fiber pack.

The sleeve 58 is a cylindrical or tapered conical shell dimensioned to slide onto the bobbin support 52 and be supported thereby. The sleeve must be sufficiently strong to resist creep induced by the circumferential stresses of the wound fiber pack, which could cause failure of the sleeve. The sleeve should not be any thicker than required by this creep and crushing limitation, and a safety margin, to avoid the adding of extra weight to the system, as the sleeve does not provide structural support. Preferably, the sleeve made from ABS material is about 0.070 inches thick.

The bobbin of the invention provides an improved approach in an optical fiber canister. It reduces the incidence of fiber pack failures due to thermal expansion mismatch, with only slightly increased weight of the canister. Although particular embodiments of the invention have been described in detail for purposes of illustration, various modifications may be made without departing from the spirit and scope of the invention. Accordingly, the invention is not to be limited except as by the appended claims.

What is claimed is:

1. A bobbin that supports an optical fiber pack, comprising:
   sleeve means for supporting a fiber pack wound thereupon, the sleeve means having a longitudinal axis; and
   support means within the sleeve means for supporting the sleeve means while permitting relative sliding movement of the sleeve means and the support means parallel to the longitudinal axis over at least a portion of the length of the sleeve means, the support means having a coefficient of thermal expansion parallel to the longitudinal axis of less than that of the sleeve means.

2. The bobbin of claim 1, wherein the support means comprises a cylindrical shell.

3. The bobbin of claim 1, wherein the support means comprises a conical shell with a taper of less than about 5 degrees.

4. The bobbin of claim 1, wherein the sleeve means is formed of acrylonitrile butadiene styrene.

5. The bobbin of claim 1, wherein the support means is a bobbin support comprising a hollow bobbin shell that fits inside the sleeve means.

6. The bobbin of claim 5, wherein the bobbin shell and the sleeve means are fixed together at one end thereof to prevent relative longitudinal movement of the bobbin shell and the sleeve means at the end where they are fixed together.

7. The bobbin of claim 5, wherein the bobbin shell is made of aluminum.

8. The bobbin of claim 5, wherein the bobbin shell is made of a composite material.

9. The bobbin of claim 5, wherein the sleeve means has a longitudinal coefficient of thermal expansion of greater than about $50 \times 10^{-6}$ per degree F.

10. The bobbin of claim 1, further including:
an optical fiber pack wound upon the sleeve means.

11. A bobbin that supports an optical fiber pack, comprising:
a bobbin support having a substantially cylindrical bobbin shell; and
a sleeve that slidably fits over the bobbin shell and is fastened thereto at one end thereof, the sleeve being disposed such that a substantially cylindrical optical fiber pack can be wound upon the sleeve, the sleeve having a longitudinal coefficient of thermal expansion selected to match that of the fiber pack in the longitudinal direction.

12. The bobbin of claim 11, further including:
an optical fiber pack wound upon the sleeve.

13. The bobbin of claim 11, wherein the bobbin support is cylindrical.

14. The bobbin of claim 11, wherein the bobbin support is conical with a taper of less than about 5 degrees.

15. A bobbin, comprising:
a substantially cylindrical bobbin support having a bobbin support flange at one end and having a longitudinal axis;
a sleeve that slides over the bobbin support, the sleeve being made of a material that has a coefficient of thermal expansion parallel to the longitudinal axis that is greater than that of the bobbin support parallel to the longitudinal axis, the sleeve having a sleeve flange at one end thereof that is fastened to the bobbin support flange, whereby the sleeve is free to expand longitudinally by a different amount than does the bobbin support, except at the end where the flanges are fastened together; and
an optical fiber pack wound upon the sleeve.

16. The bobbin of claim 15, wherein the material of the sleeve has a coefficient of thermal expansion of at least about $50 \times 10^{-6}$ per degree F.

* * * * *